United States Patent
Pawar

(10) Patent No.: US 11,323,349 B2
(45) Date of Patent: May 3, 2022

(54) OPTIMIZED AND SCALABLE METHOD OF DETECTING DEAD INTERNET KEY EXCHANGE (IKE) PEERS

(71) Applicant: VMWARE, INC., Palo Alto, CA (US)

(72) Inventor: Sudesh Pawar, Pune (IN)

(73) Assignee: VMware, Inc., Palo Alto, CA (US)

(*) Notice: Subject to any disclaimer, the term of this patent is extended or adjusted under 35 U.S.C. 154(b) by 32 days.

(21) Appl. No.: 16/733,281

(22) Filed: Jan. 3, 2020

(65) Prior Publication Data

US 2021/0152518 A1 May 20, 2021

(30) Foreign Application Priority Data

Nov. 19, 2019 (IN) .............................. 201941047109

(51) Int. Cl.
*H04L 29/06* (2006.01)
*H04L 43/0876* (2022.01)
(Continued)

(52) U.S. Cl.
CPC ...... *H04L 43/0876* (2013.01); *H04L 12/4633* (2013.01); *H04L 43/065* (2013.01); *H04L 43/0847* (2013.01); *H04L 43/106* (2013.01); *H04L 63/029* (2013.01); *H04L 63/0435* (2013.01); *H04L 63/0485* (2013.01);
(Continued)

(58) Field of Classification Search
CPC .............. H04L 43/0876; H04L 63/029; H04L 63/061; H04L 43/0847; H04L 43/065; H04L 12/4633; H04L 63/0485; H04L 63/0435; H04L 63/164; H04L 43/106; H04L 2463/121
See application file for complete search history.

(56) References Cited

U.S. PATENT DOCUMENTS

| | | | |
|---|---|---|---|
| 6,978,308 B2 * | 12/2005 | Boden | H04L 12/4633 370/389 |
| 7,159,242 B2 * | 1/2007 | Genty | H04L 29/12009 709/220 |

(Continued)

OTHER PUBLICATIONS

Frankel et al., IP Security (Ipsec) and Internet Key Exchange (IKE) Document Roadmap, Internet Engineering Task Force (IETF), (Reb. 2011) (Year: 2011).

(Continued)

*Primary Examiner* — Sanchit K Sarker
(74) *Attorney, Agent, or Firm* — Patterson + Sheridan, LLP

(57) ABSTRACT

Certain embodiments described herein relate to a method for performing dead peer detection (DPD) by a local gateway. The method includes periodically examining one or more array elements of a timestamp array. The method further includes, for each of the examined one or more array elements, determining whether a corresponding idle timeout threshold is met. The method further includes, upon determining that the corresponding idle timeout threshold is not met, refraining from causing a notification to be transmitted to a peer gateway. The method also includes, upon determining that the corresponding idle timeout threshold is met, causing a notification to be transmitted to the peer gateway to determine whether the peer gateway is responsive with respect to a tunnel associated with the examined array element.

23 Claims, 6 Drawing Sheets

(51) Int. Cl.
*H04L 43/0823* (2022.01)
*H04L 43/065* (2022.01)
*H04L 12/46* (2006.01)
*H04L 43/106* (2022.01)

(52) U.S. Cl.
CPC .......... *H04L 63/061* (2013.01); *H04L 63/164* (2013.01); *H04L 2463/121* (2013.01)

(56) References Cited

U.S. PATENT DOCUMENTS

| | | | | |
|---|---|---|---|---|
| 7,426,636 | B1* | 9/2008 | McGrew | H04L 63/0272 713/160 |
| 7,478,427 | B2 | 1/2009 | Mukherjee et al. | |
| 7,496,748 | B2* | 2/2009 | Mercer | H04L 63/0485 713/150 |
| 8,433,691 | B2* | 4/2013 | Noehring | H04L 63/0485 707/694 |
| 10,454,879 | B2* | 10/2019 | Chan | H04L 12/4633 |
| 10,454,899 | B1* | 10/2019 | Gabrielson | H04L 9/3268 |
| 2003/0108054 | A1* | 6/2003 | Williams | H04L 69/169 370/401 |
| 2008/0298312 | A1* | 12/2008 | Zhang | H04W 76/12 370/328 |
| 2009/0016334 | A1* | 1/2009 | Forsberg | H04W 28/06 370/389 |
| 2015/0180774 | A1* | 6/2015 | Loach | H04L 41/145 370/392 |
| 2015/0304427 | A1 | 10/2015 | Ortacdag et al. | |
| 2018/0092140 | A1* | 3/2018 | Dong | H04W 76/12 |
| 2018/0139272 | A1* | 5/2018 | Puri | H04L 67/1023 |
| 2019/0021121 | A1* | 1/2019 | Aravamudhan | H04M 15/8228 |
| 2019/0075078 | A1 | 3/2019 | Tinnakomsrisuphap et al. | |
| 2019/0173851 | A1 | 6/2019 | Jain et al. | |
| 2021/0036887 | A1* | 2/2021 | Meng | H04L 12/66 |
| 2021/0152518 | A1 | 5/2021 | Pawar | |

OTHER PUBLICATIONS

Piccolo et al., A Survey of Network Isolation Solutions for Multi-Tenant Data Centers, IEEE Communications Surveys & Tutorials vol. 18, No. 4, 2787-2821 (2016) (Year: 2016).

* cited by examiner

OPTIMIZED AND SCALABLE METHOD OF DETECTING DEAD INTERNET KEY EXCHANGE (IKE) PEERS

RELATED APPLICATIONS

Benefit is claimed under 35 U.S.C. 119(a)-(d) to Foreign Application Serial No. 201941047109 filed in India entitled "OPTIMIZED AND SCALABLE METHOD OF DETECTING DEAD INTERNET KEY EXCHANGE (IKE) PEERS", on Nov. 19, 2019, by VMWARE, INC., which is herein incorporated in its entirety by reference for all purposes.

BACKGROUND

IP security protocols are widely used to protect packets communicated between endpoints (EPs), such as over the Internet, between gateways, between data centers (e.g., on premises data centers, cloud data centers, etc.), within data centers, etc. For example, the EPs may be configured with IPSec protocols to engage in an internet key exchange (IKE) negotiation process to establish an IKE tunnel, which refers to a secure tunnel that allows for the EPs to further establish an IPSec tunnel including security associations (SAs), between the endpoints. In some embodiments, each SA is a one-way or simplex connection, and therefore at least two SAs, one for each direction, are established between two endpoints, which may also be referred to as IPSec peers. These security associations are a form of contract between the endpoints detailing how to exchange and protect information among each other. In some embodiments, each SA is comprised of a mutually agreed-upon key, one or more security protocols, and/or a security parameter index (SPI) value. After SAs have been established between two endpoints, an IPSec protocol may be used to protect data packets for transmission.

For IPSec in the Encapsulating Security Payload (ESP) tunnel mode, IPSec gateways (e.g., tunnel endpoints) (also referred to as "gateways") are used for applying IPSec protocols to encrypt and encapsulate egress packets from a source endpoint and decrypt and decapsulate ingress packets for a destination endpoint to securely transmit packets over a network that connects the gateways. For example, a source endpoint may generate and route egress IP packets to a source gateway associated with the source endpoint. In particular, the source endpoint may generate an IP packet including a header with the IP address of the source endpoint set as the source IP address and the IP address of the destination endpoint set as the destination IP address. A MAC address of the source gateway may further be set as a next-hop MAC address of the IP packet in the header. In such an example, the destination MAC address of the egress packet may further be set as next-hop MAC address.

The source gateway receives the IP packet and encrypts the original IP packet including the header of the original IP packet based on a SA established between the source gateway and the destination gateway. For example, the source gateway encrypts the original IP packet with a mutually agreed-upon key of the SA. The source gateway further encapsulates the encrypted packet by adding a new IP header and an ESP header (e.g., including an SPI value corresponding to the SA used to encrypt the packet) to the encrypted packet to generate an encapsulated ESP encrypted data packet. The new IP header includes a source IP address of the source gateway and a destination IP address of the destination gateway. The new IP header is used to forward the encapsulated ESP encrypted data packet through a network from the source gateway to the destination gateway.

The destination gateway may then decapsulate and decrypt the encapsulated ESP encrypted data packet to extract the original IP packet. For example, the destination gateway may determine the SA (e.g., mutually agreed-upon key) to use to decrypt the encapsulated ESP encrypted data packet based on the SPI value included in the ESP header. Based on the destination IP address in the header of the original IP packet, the destination gateway forwards the original IP packet to the destination endpoint.

Gateways may be configured to perform dead peer detection (DPD), which refers to a mechanism for a gateway to detect whether a peer gateway with which an IKE tunnel has been established, is non-responsive or dead. The existing techniques for performing DPD are not scalable, resource efficient, and/or as effective as techniques described herein.

SUMMARY

Herein described are one or more embodiments of a method for performing dead peer detection (DPD) by a local gateway. The method includes periodically examining one or more array elements of a timestamp array. Each of the one or more array elements corresponds to a tunnel established between the local gateway and a peer gateway, the tunnel corresponding to one or more security tunnels, the one or more security tunnels corresponding to one or more inbound security associations (SAs) established between the local gateway and the peer gateway. Each of the one or more array elements comprises a timestamp indicating a time at which a last packet associated with any of the one or more inbound SAs of the corresponding one or more security tunnels of the corresponding tunnel was received by the gateway. The method further includes, for each of the examined one or more array elements, determining whether a corresponding idle timeout threshold is met. The method further includes, upon determining that the corresponding idle timeout threshold is not met, refraining from causing a notification to be transmitted to the peer gateway. The method also includes, upon determining that the corresponding idle timeout threshold is met, causing a notification to be transmitted to the peer gateway to determine whether the peer gateway is responsive with respect to a tunnel associated with the examined array element.

Also described herein are embodiments of a non-transitory computer readable medium comprising instructions to be executed in a computer system, wherein the instructions when executed in the computer system perform the method described above for performing dead peer detection (DPD).

Also described herein are embodiments of a computer system comprising a memory storing executable instructions as well as a processor in data communications with the memory and configured to execute the instructions to cause the computer system to perform the method described above for performing dead peer detection (DPD).

DETAILED DESCRIPTION

Certain embodiments described herein relate to configuring a gateway to periodically determine the liveliness of each of its IKE tunnels, using a timestamp array that is indexed by IKE tunnel IDs of the IKE tunnels. By keeping track of the liveliness of the IKE tunnels, instead of each of the IPSec tunnels, the gateway is able to efficiently perform DPD in a scalable, efficient, and effective manner, especially when the gateway is performing tunneling using the policy-based or route-based modes of tunneling. Also, certain embodiments described herein relate to using a bitmap in conjunction with the timestamp array to optimize the write operations associated with the timestamp array, as further described below. Further, certain embodiments relate to a suppress time parameter used by the timestamp array to ensure that back to back DPD triggers are not transmitted.

Figure 1:
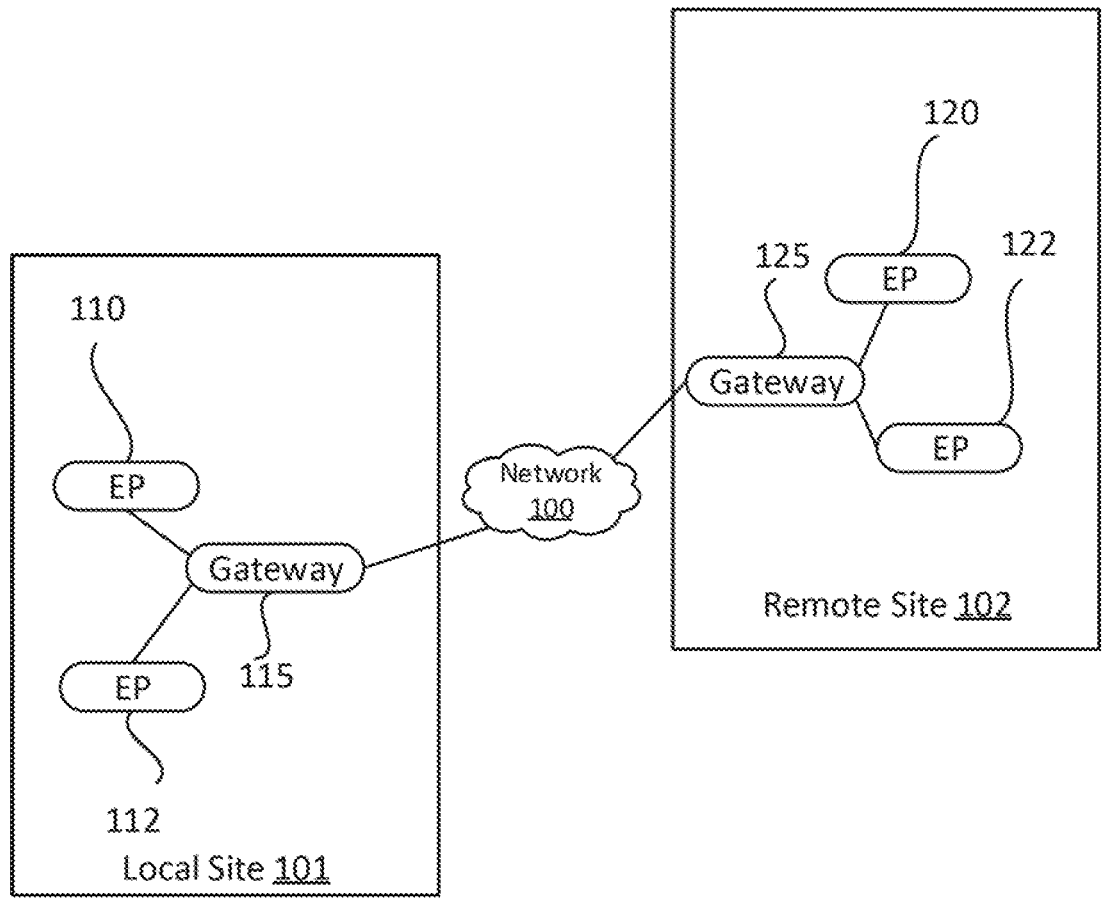
FIG. 1 illustrates an example of a network, in accordance to some embodiments.

FIG. 1 illustrates an example of a network 100, representing a physical network, which connects a local site 101 to a remote site 102. As shown by FIG. 1, network 100 connects IPSec gateway 115 and gateway 125. A gateway may be a physical computing device (e.g., physical server, physical host) or a virtualized computing instance (e.g., virtual machine, container, data compute node, isolated user space instance, etc.), as further discussed herein. An IPSec gateway refers to a gateway that is configured with IPSec protocols to secure network traffic exchanged between itself and a peer IPSec gateway.

Gateways 115 and 125 may connect endpoints (EPs), including EPs 110, 112, 120, and 122, for example, to stretch a network across geographically distant sites. An EP refers generally to an originating EP ("source EP") or a terminating EP ("destination EP") of a flow of network packets, which can include one or more data packets passed from the source to the destination EP. In practice, an EP may be a physical computing device (e.g., physical server, physical host) or a virtualized computing instance (e.g., virtual machine, container, data compute node, isolated user space instance), as further discussed herein.

EPs may communicate with or transmit data packets to other EPs via gateways, which are connected through network 100, as discussed. For example, EP 110 may transmit a data packet to EP 120 in a secured fashion via gateways 115 and 125, acting as a source gateway and a destination gateway, respectively. As described above, gateways 115 and 125 implement IPSec protocols, including the ESP tunnel mode, to secure communication between one another. In some embodiments, before any data can be securely transferred between EPs 110 and 120 using the IPSec framework, security associations (SAs) may need to be established between gateways 115 and 125. In some embodiments, the SAs may be established by gateways 115 and 125 on behalf of EPs 110 and 120.

In some cases, the Internet Key Exchange (IKE) protocol is used to generate these SAs between gateways 115 and 125. For example, gateways 115 and 125 may perform a two-phase IKE negotiation process. In Phase 1 of the IKE negotiation process, gateways 115 and 125 authenticate each other and establish a secure channel, referred to as an IKE tunnel, between each other. Gateways 115 and 125 then further communicate over the IKE tunnel to engage in Phase 2 of the IKE negotiation process in order to establish two SAs between gateways 115 and gateway 125, one for traffic sent from gateway 115 as a source to gateway 125 as a destination and one for traffic sent from gateway 125 as a source to gateway 115 as a destination (e.g., an inbound and an outbound SA). The SAs include a mutually agreed-upon key, one or more security protocols, and/or an SPI value for use in securely communicating packets between gateways 115 and 125, the packets being originated by a source EP 110 and destined for a destination EP 120, and vice versa.

The mutually agreed-upon key is used for encrypting packets originated by EP 110 and received at gateway 115 and for decrypting the packets at gateway 125, and vice versa. The one or more security protocols, described above, may be one or more IPSec security protocols such as Authentication Header (AH), Encapsulating Security Payload (ESP), etc. By establishing SAs among themselves, gateways 115 and 125 have effectively established what may be referred to as an IPSec tunnel to protect data packets transmitted between gateways 115 and 125 for EPs 110 and 120. In addition to a mutually agreed-upon key and security protocol, a SA includes an SPI value. In some embodiments, each SPI value is a value associated with a SA, which enables a gateway to distinguish among multiple active SAs. As an example, SPI values may be used to distinguish between the inbound and outbound SAs of a certain IPSec tunnel.

In another example, SPI values are used to distinguish between SAs of different IPSec tunnels. For example, in addition to the IPSec tunnel established for the over-the-network communication of packets exchanged between EPs 110 and 120, another IPSec tunnel may be established between gateways 115 and 125 for the over-the-network communication of packets exchanged between EPs 112 and 122. This additional IPSec tunnel, established for EPs 112 and 122, has its own outbound and inbound SAs. In this example, each gateway is able to distinguish between SAs of these two IPSec tunnels using each SAs unique SPI value. As described below in relation to FIGS. 3A-3B, there are other scenarios where multiple IKE tunnels and/or IPSec tunnels may be established between two gateways.

Though certain embodiments are described herein with respect to the ESP security protocol, other suitable IPSec security protocols (e.g., AH protocol) alone or in combination with ESP, may be used in accordance with the embodiments described herein. Further, the embodiments described herein may similarly be used for different types of traffic such as IPv4, IPv6, etc.

Figure 2:
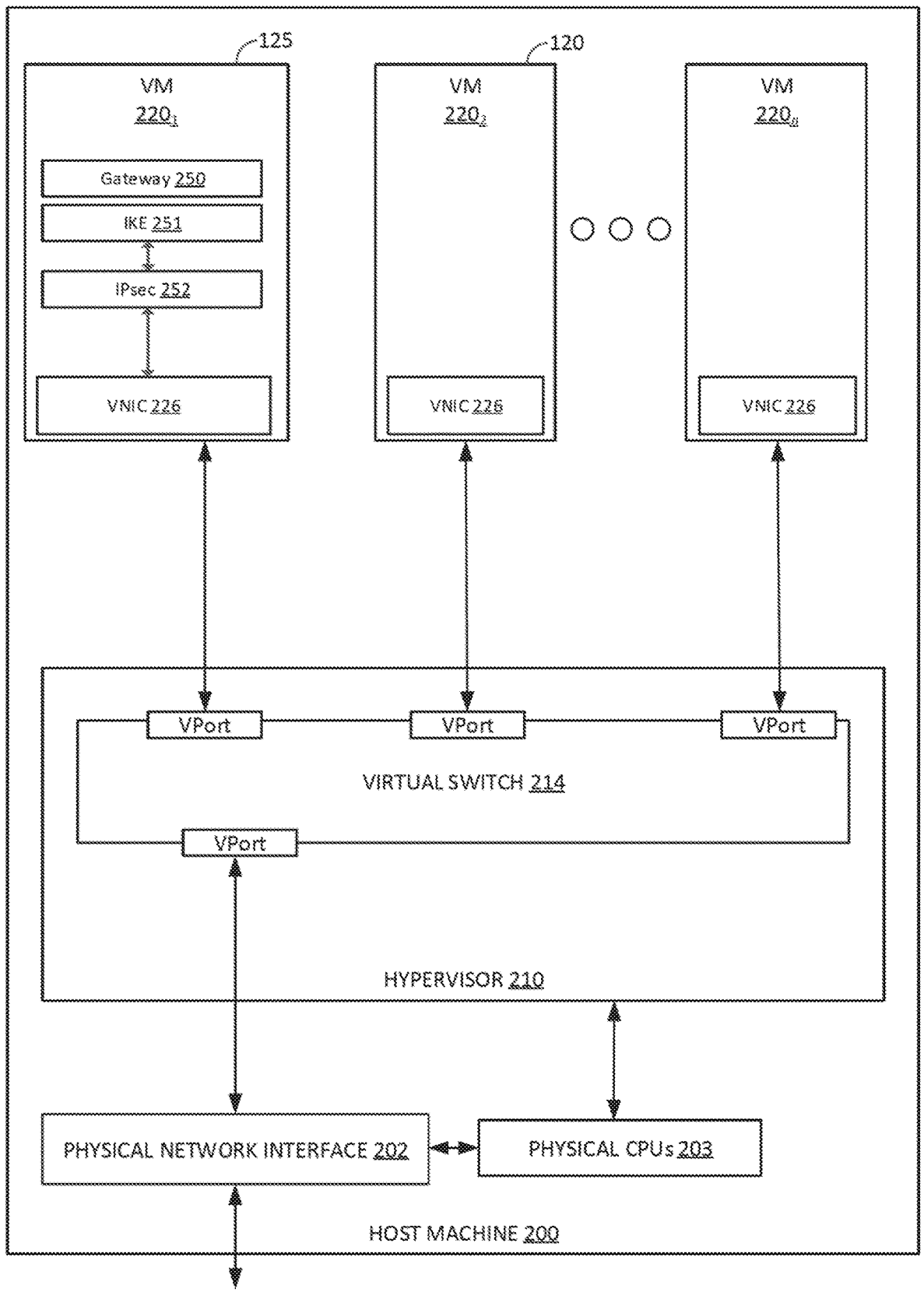
FIG. 2 illustrates an example block diagram of host machine for use in a virtualized network environment, according to some embodiments.

FIG. 2 illustrates an example block diagram of host machine 200 for use in a virtualized network environment, according to some embodiments. As illustrated, host machine 200 includes a physical network interface controller (PNIC) 202, a hypervisor 210, and a plurality of virtual machines $220_1$, $220_2$, ... $220_n$.

Host machine 200 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance) or physical computing devices. In certain embodiments, host machine 200 is a physical general purpose computer (e.g., a server, workstation, etc.) and includes one or more physical central processing units (CPUs) 203. Although not shown, in addition to physical CPUs 203, host machine 200 may also include a system memory, and non-volatile data storage, in addition to one or more physical network interfaces, such as PNIC 202, for communicating with other hardware computing platforms, entities, or host machines on a physical network accessible through PNIC 202.

Hypervisor 210 serves as an interface between virtual machines 220 and PNIC 202, as well as other physical resources (including physical CPUs 203) available on host machine 200. Each VM 220 is shown including a virtual network interface card (VNIC) 226, which is responsible for exchanging packets between VM 220 and hypervisor 210. Hypervisor 210 architecture may vary. In some aspects, hypervisor 210 can be installed as system level software directly on the host 200 (often referred to as a "bare metal" installation) and be conceptually interposed between the physical hardware and the guest operating systems executing in the VMs. Alternatively, hypervisor 210 may conceptually run "on top of" a conventional host operating system in the server. In some implementations, hypervisor 210 may comprise system level software as well as a privileged VM machine (not shown) that has access to the physical hardware resources of the host 210. Though shown as included in VMs 220, it should be understood that VNICs 226 may be implemented by code (e.g., VM monitor code) associated with hypervisor 210. VNICs 226 may be, in some cases, a software implementation of a physical network interface card. Each VM 220 is connected to a virtual port (vport) provided by virtual switch 214 through the VM's associated VNIC 226. Virtual switch 214 may serve as physical network switch, i.e., serve as an edge device on the physical network, but implemented in software. Virtual switch 214 is connected to PNIC 202 to allow network traffic to be exchanged between VMs 220 executing on host machine 200 and destinations on an external physical network.

In some embodiments, a VM 220 is configured to perform the functions of a gateway. For example, VM $220_1$ may be configured as a gateway, such as gateway 125, and include a gateway layer or component 250, which logically represents a set of instructions for implementing gateway functions. VM $220_1$ is henceforth referred to as gateway 125. Gateway 125 is also configured with an IKE component 251 (also referred to as an IKE daemon), which logically represents a set of instructions for performing a two-phase IKE negotiation with an IKE component of gateway 115, or any other peer gateway, for establishing an IKE tunnel as well as one or more IPSec tunnels. IKE component 251 is also configured with one or more dead peer detection (DPD) techniques, as described herein, for determining whether the IKE component of the peer gateway is "dead" or "alive." For example, IKE component 251 may be configured to transmit one or more trigger messages to the IKE component of the peer gateway to determine its liveliness. Note that two IKE components that have established an IKE tunnel among themselves are referred to as IKE peers.

Gateway 125 is further configured to implement IPSec protocols and functionality using an IPSec component 252. More specifically, IPSec component 252 encrypts outgoing packets destined for a certain destination gateway, such as gateway 115, by encapsulating them with, for example, ESP headers based on a corresponding outbound SA. In each packet's ESP header, IPSec component 252 also includes an SPI value, associated with the outbound SA. IPSec component 252 is also configured to decrypt incoming encapsulated ESP encrypted data packets received from a source gateway, such as gateway 115.

Further, another VM 220 executing on host machine 200, or on another host, may be configured as an EP associated with gateway 125. For example, VM $220_2$ may be EP 120 of FIG. 1 associated with gateway 125. VM $220_2$ is henceforth referred to as EP 120.

In some embodiments, a source EP, such as EP 110, may generate an IP packet to send to EP 120. EP 110 may forward the IP packet to gateway 115, which encrypts (e.g., using an IPSec component, similar to IPSec component 252) and encapsulates (e.g., using a gateway component, similar to gateway component 250) the packet using an IPSec protocol (e.g., ESP tunnel mode) to generate an encapsulated ESP encrypted data packet. Gateway 115 then sends the encapsulated ESP encrypted data packet to gateway 125. The encapsulated ESP encrypted data packet is, therefore, received at virtual switch 214 of host machine 200 via PNIC 202. Virtual switch 214 sends the encapsulated ESP encrypted data packet to VNIC 226 of gateway 125. Subsequently, IPSec component 252 examines the ESP header of encapsulated ESP encrypted data packet to identify an SPI value indicated by the header. IPSec component 252 then uses the SPI value as well as the destination IP address in the packet to identify an inbound SA in a security association database (SAD). Having identified an SA in the SAD, IPSec component 252 retrieves a mutually agreed-upon key from the SA to decrypt the packet. IPSec component 252 then passes a decrypted encapsulated packet to gateway component 250, which then decapsulates the packet to reach an inner packet that is subsequently passed back to VNIC 226 to be forwarded by virtual switch to its final destination EP 120. Note that FIG. 2 illustrates only one example of a gateway. In other examples, other virtual computing instances may be used to perform the functions of a gateway. Also, a gateway may be a physical computing device.

Figure 3A:
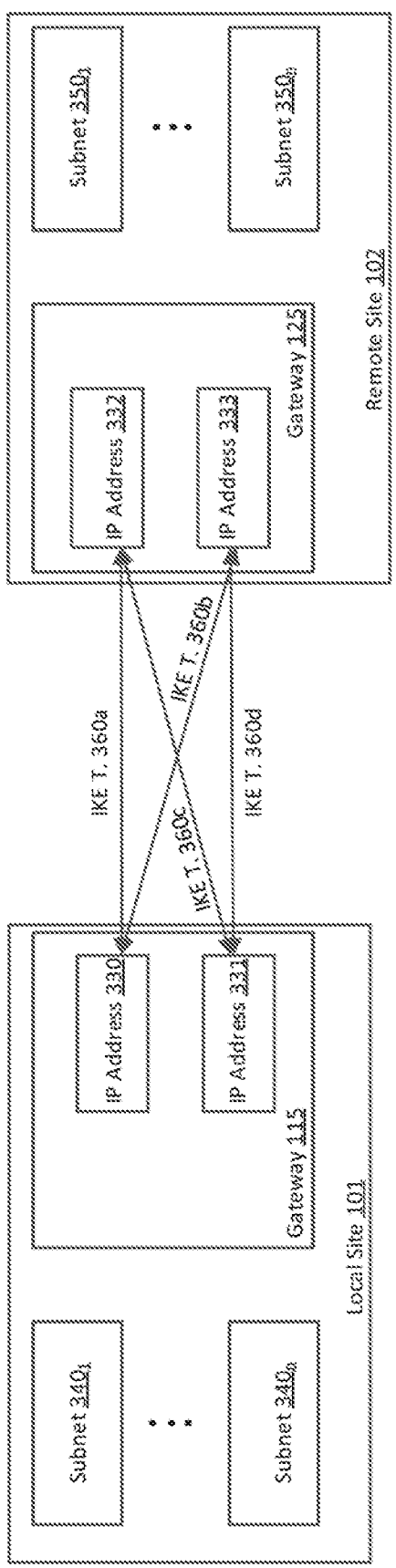
FIG. 3A illustrates an example of two peer gateways, which have established multiple IKE tunnels among themselves through the use of different IP addresses, according to some embodiments.
Figure 3B:
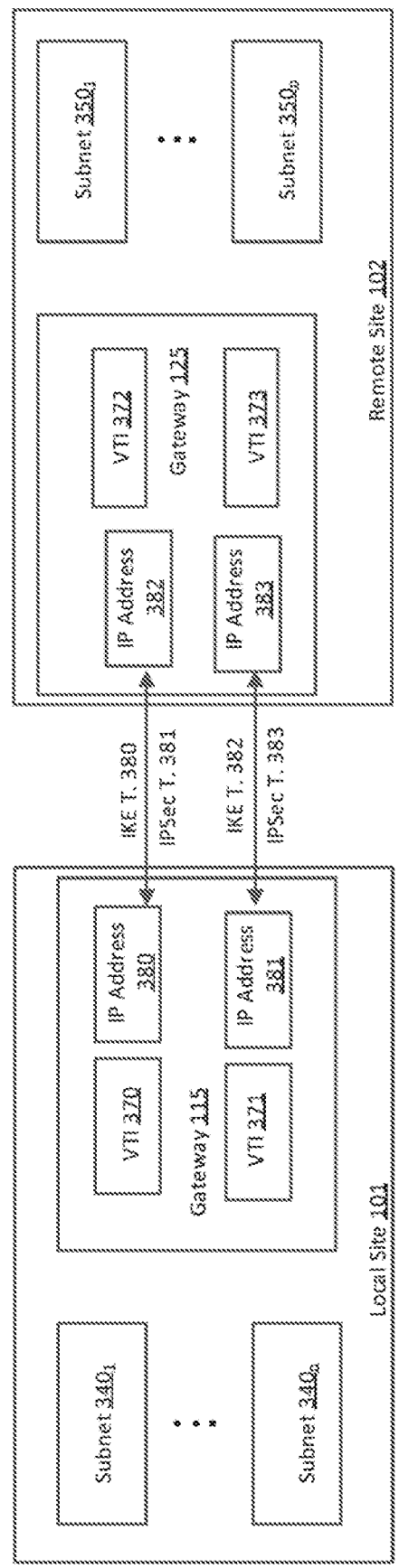
FIG. 3B illustrates an example of two peer gateways, which have multiple IKE tunnels among themselves through the use of different virtual tunnel interfaces (VTIs), according to some embodiments.

FIGS. 3A and 3B illustrate embodiments in which gateways 115 and 125 are configured to establish multiple IKE tunnels among themselves.

FIG. 3A illustrates an example of two peer gateways, which have established multiple IKE tunnels among themselves through the use of different IP addresses. In the example of FIG. 3A, gateways 115 and 125 are engaged in policy-based tunneling (e.g., policy-based virtual private network (VPN) tunneling), having established multiple IKE tunnels 360a-360d (collectively referred to as IKE tunnels 360) for securing network traffic exchanged between subnets $340_1$-$340_n$, associated with gateway 115, at local site 110, and subnets $350_1$-$350_n$, associated with gateway 125, at remote site 102. As one of ordinary skill in the art appreciates, a subnet corresponds to a logical partition of a network that comprises a pool of IP addresses associated with different EPs. For example, at local site 101, there may be a hundred EPs, including EPs 110 and 112, with a hundred or more IP addresses. The network at local site 101 may be logically partitioned into, for example, ten subnets. In such an example, IKE tunnels 360a-360d as well as a number of IPSec tunnels per IKE tunnel, are established for securing network traffic exchanged between subnets 340 and subnets 350. Note that securing network traffic exchanged between subnets 340 and subnets 350 refers to securing traffic exchanged between gateways 115 and 125 that is originated by subnets 340 and destined for subnets 350, and vice versa.

In other words, the traffic that is exchanged between subnets 340 and 350 is only encrypted when it travels over the network that connects gateways 115 and 125.

As shown, gateway 115 is configured with IP addresses 330 and 331 while gateway 125 is configured with IP addresses 332 and 333. In cases where a gateway is a VM, the VM's VNIC may be configured with multiple IP addresses. For example, in the embodiment of FIG. 2 where VM $220_1$ is gateway 125, VNIC 226 may be configured with IP addresses 332 and 333. In such an example, VM $220_1$ may then execute an IKE component for handling IKE tunneling for IP addresses 332 and 333. VM $220_1$ may also have access to a security policy database (SPD) and a security association database (SAD) for all IKE tunnels established on gateway 125 (e.g., there is a single SPD and a single SAD per gateway). The operations and use of SPDs and SADs are described in more detail below. In examples where a gateway is a physical machine, the gateway's PNIC may be configured with multiple IP addresses.

Similar to gateway 125, in the example of FIG. 3A, each of the IP addresses 330 and 331 of gateway 115 is associated with an IKE component that is able to establish an IKE tunnel with the peer IKE component that is associated with IP addresses 332 and 333 of peer gateway 125. For example, IKE tunnel 360a is established for IP address 330 and address 332 between the two IKE components. Similarly, IP address 330 is used to establish another IKE tunnel with IP address 333. As such, in the example of FIG. 3A, a maximum of four IKE tunnels may be established between gateways 115 and 125.

For each of IKE tunnels 360, one or more IPSec tunnels may be established for securing network traffic between one or more pairs of subnets ("subnet pairs"). A subnet pair refers to a local subnet, such as subnet $340_1$ and a remote subnet, such as subnet $350_1$. For example, IKE component 251 of gateway 125 may engage in Phase 1 of an IKE negotiation process with the IKE component of gateway 115 to establish IKE tunnel 360a. Over a secure IKE tunnel 360a, the two IKE components then engage in Phase 2 of the IKE negotiation process to establish an IPSec tunnel for securing network traffic, for example, between any of the EPs in subnet $340_1$ and any of the EPs in subnet $350_1$. This means that any packets exchanged between any of the EPs in subnet $340_1$ and any of the EPs in subnet $350_1$ is secured when it travels over the network, using the same IPSec tunnel, or more specifically, the same two unidirectional SAs associated with the IPSec tunnel. The SPD of gateway 125 comprises policy entries, each associated with a different subnet pair. The SAD of gateway 125 also comprises SAs, each associated with a corresponding subnet pair.

To illustrate this with an example, when a packet is received by gateway 125 from, for example, an EP in subnet $350_1$, IPSec component 252 of gateway 125 first determines whether the packet should be secured using IPSec and, if yes, based on what policy. IPSec component 252 selects a policy from the SPD of gateway 125 based on the packet's source IP address and destination IP address, among other things. The policy may indicate whether the packet should be discarded, bypassed, or processed using an IPSec SA. The policy may also indicate what outbound SA, in the SAD of gateway 125, should be used for encrypting the packet. After identifying the outbound SA, IPSec component 252 then encrypts the packet using the encryption key indicated by the outbound SA and includes a corresponding SPI value in an ESP header of the packet. When the ESP encrypted encapsulated packet is received at gateway 115, the IPSec component of gateway 115 first selects an inbound SA from an SAD of gateway 115, at least based on the SPI value in the ESP header of the packet, decrypts the packet using a decryption key in the inbound SA, and then performs a look up of a SPD of gateway 115 using the source and destination IP addresses to identify a policy, etc. Using the policy, the IPSec component then determines if the packet was properly secured, etc., and finally passes the original packet, which is a decrypted and decapsulated packet, to, for example a switch (e.g., a virtual switch) to be forward to its final destination.

Similar to the IPSec tunnel established for securing network traffic exchanged between the EPs in subnet $340_1$ and EPs in subnet $350_1$, another IPSec tunnel may be established through IKE tunnel 360a for securing network traffic exchanged between any of the EPs in subnet $340_2$ and any of the EPs in subnet $350_2$. Additional IPSec tunnels for additional subnet pairs may be also established through IKE tunnel 360a. Also, similar to IKE tunnel 360a, one or more IPSec tunnels may be established through each of IKE tunnels 360b, 360c, and 360d to secure network traffic between other subnet pairs.

FIG. 3B illustrates an example of two peer gateways 115 and 125, each having multiple IP addresses, which have multiple IKE tunnels among themselves. Network traffic exchanged between peer gateways 115 and 125 is forwarded using virtual tunnel interfaces (VTIs). VTIs provide a routable interface type for terminating IPSec tunnels and an easy way to define protection between sites to form, for example, an overlay network. More specifically, in the example of FIG. 3B, gateways 115 and 125 are engaged in route-based tunneling (e.g., route-based virtual private network (VPN) tunneling), such that there is a single IKE tunnel and a single IPSec tunnel established between each of the external pair of IP addresses. Traffic associated with each of the IKE tunnels and its associated IPSec tunnel is forwarded by a single pair of VTIs. For example, FIG. 3B shows gateway 115 being configured with VTIs 370 and 371 and gateway 125 being configured with VTIs 372 and 373. A single IKE tunnel 380 as well as a single IPSec tunnel 381 are established between IP address 380 and IP address 382 and the traffic associated with those tunnels are forwarded through VTI 370 and VTI 372, which may be referred to as a VTI pair. Similarly, a single IKE tunnel 382 as well as a single IPSec tunnel 383 are established between IP address 381 and IP address 383 and the traffic associated with those tunnels are forwarded through VTI 371 and VTI 373. Note that although in the examples of FIG. 3 only a single gateway with multiple IP addresses is shown at each site, in other examples, multiple gateways may be used at each site running in high availability (HA) mode.

Note that a gateway may be configured with multiple VTIs to provide redundancy, achieve a higher throughput, and provide for a higher level of load sharing. For example, in the embodiment of FIG. 3B, the over-the network traffic exchanged between subnets $340_1$-$340_n$ and subnets $350_1$-$350_n$ can be handled, in parallel, by two different IKE tunnels, one between VTIs 370 and 372 and another between VTIs 371 and 373.

As described above, IKE components may be configured to perform DPD, which refers to a mechanism for an IKE component to detect whether a peer IKE component, with which there are active IKE and IPSec tunnels, is non-responsive or dead. Several techniques may be used for performing DPD. An example of a DPD technique is referred to as a Periodic DPD ("PDPD"). An IKE component, such as IKE component 251 of gateway 125, that is configured with PDPD periodically transmits notifications (referred to as an R-U-THERE Notification ("notification") to a peer IKE component at peer gateway 115 to determine whether, for a certain IKE tunnel, the peer IKE component is non-responsive. More specifically, IKE component 251 sends periodic notifications to the peer IKE component for each IKE tunnel that is established between the two IKE peers. After a certain number of notifications have been sent, for a certain IKE tunnel, to the peer IKE component without receiving any responses in return, IKE component 251 may declare the peer IKE component dead for that specific IKE tunnel and remove the IKE tunnels and the corresponding IPSec tunnel(s).

With PDPD, periodic notifications are sent to a peer IKE component regardless of whether there is ongoing inbound network traffic being received from the peer IKE component. It may, however, be inefficient for an IKE component to periodically transmit notifications to a peer IKE component when the ongoing inbound traffic serves as proof that the peer IKE component is responsive. Accordingly, a technique referred to as On-Demand DPD ("ODPD") may be used in some cases that configures an IPSec component of a gateway to trigger the corresponding IKE component to transmit one or more notifications to the peer IKE component if (1) no network traffic has been received from the peer IKE component for a certain period of time, and (2) there is outbound traffic to be transmitted to the peer IKE component. If the two conditions above are met, then the IPSec component triggers the IKE component to transmit notifications to the peer IKE component in order to determine if the peer IKE component is responsive. However, utilizing the ODPD technique described above may not be scalable, resource efficient, and/or as effective when there are multiple IKE tunnels between gateway peers, with each IKE tunnel having one or more IPSec tunnels established thereon.

For example, an IPSec component configured with ODPD is configured to keep track of whether the two conditions above are met by recording a timestamp every time a packet is received through each of the IPSec tunnel(s) established between the IKE component and the peer IKE component. For example, for any received packet, the IPSec component may identify the SPI value in the packet's ESP header, identify the corresponding inbound SA, and record a timestamp for that inbound SA, the timestamp indicating the time (e.g., which may correspond to the current CPU clock) at which the last packet was received for that inbound SA. The IPSec component similarly keeps a timestamp for each active inbound SA on the corresponding IKE tunnel.

To determine whether a notification should be sent to the peer IKE component, the IPSec component first waits until there is outbound traffic to be sent through one or more IPSec tunnels associated with the corresponding IKE tunnel. If there is outbound traffic, then the IPSec component checks to see whether all the inbound SAs associated with the one or more IPSec tunnels of the IKE tunnel have been idle for more than an idle time threshold. In other words, to determine the idleness of the peer IKE component, the IPSec component may be configured to calculate each inbound SA's idle period, which corresponds to the amount of time that has passed since the time indicated by the inbound SA's timestamp, and whether the idle period is larger than a certain idle time threshold. If all the inbound SAs of the IKE tunnel are determined to be idle, then the IPSec component sends a DPD trigger message to the IKE component to trigger the IKE component to transmit one or more notifications to the peer IKE component to determine whether the peer IKE component is in fact un-responsive or not with respect to that IKE tunnel. Accordingly, the ODPD technique in situations where there are multiple IKE tunnels between gateway peers, with each IKE tunnel having one or more IPSec tunnels established thereon, is not scalable, resource efficient, and effective.

More specifically, in the case of policy-based tunneling, where multiple (e.g., hundreds or thousands of) IPSec tunnels are established on a single IKE process, recording a timestamp for each of the inbound SAs associated with an IKE tunnel, in response to receiving a corresponding packet, and further calculating whether all inbound SAs are idle, consumes large amounts of compute and network resources, among other things. Also, in the case of route-based tunneling, it may not be effective to wait until there is outbound traffic to be sent over a certain IPSec tunnel before examining whether the peer IKE component is non-responsive. In other words, in such cases, it is more advantageous to determine, in advance, that the IKE component is non-responsive, remove the corresponding IKE and IPSec tunnel, and switch to the IKE and IPSec tunnels of another VTI pair, even before there is outbound traffic to be sent over the IPSec tunnel associated with the idle peer IKE component. That way there is no delay in transmission and the outbound traffic can be immediately transmitted over the active IKE tunnel.

Also, generally, because outgoing notifications and notification responses are encrypted using a corresponding IKE tunnel, in cases where there are many IKE tunnels, a high CPU consumption results.

Accordingly, certain embodiments described herein relate to configuring a gateway to periodically determine the liveliness of each of its IKE tunnels, using a timestamp array that is indexed by IKE tunnel IDs of the IKE tunnels. By keeping tracking of the liveliness of the IKE tunnels, instead of each of the IPSec tunnels, the gateway is able to efficiently perform DPD in a scalable, efficient, and effective manner, especially when the gateway is performing tunneling using the policy-based or route-based modes of tunneling. Also, certain embodiments described herein relate to using a bitmap in conjunction with the timestamp array to optimize the write operations associated with the timestamp array, as further described below.

Figure 4:
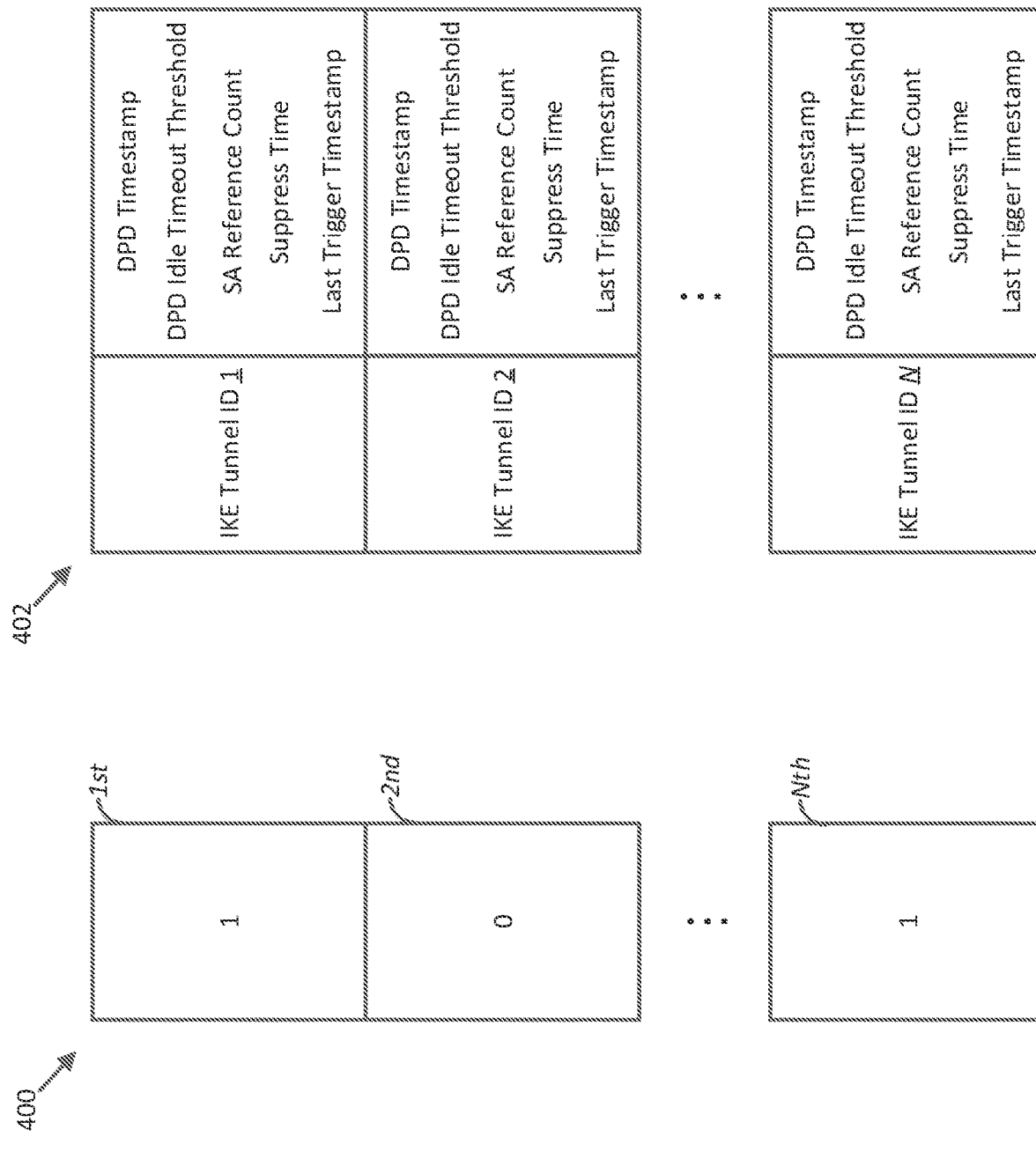
FIG. 4 illustrates an example of a timestamp array as well as a corresponding bitmap, according to some embodiments.

FIG. 4 illustrates an example of a timestamp array ("array") 402 that is indexed by IKE tunnel IDs of a number of IKE tunnels associated with a gateway that has access to or stores array 402. For example, a gateway, such as gateway 125 of FIGS. 1 and 2 may have established N IKE tunnels with gateway 115. As described in further detail below, when establishing each of these IKE tunnels together, IKE component 251 and the peer IKE component of gateway 115 generate or set an IKE tunnel ID for the IKE tunnel and insert the IKE tunnel ID in the inbound SAs that are passed to or installed in their corresponding IPSec components. Each of the gateways then keeps track of the liveliness of the IKE tunnel using an array such as array 402.

Note that in certain cases, IKE components may be configured to use a combination of DPD techniques. For example, the IKE components may be configured to use the DPD techniques disclosed herein as well as PDPD or another DPD technique. In such cases, the IKE components may be configured to use the DPD techniques disclosed herein for some IKE tunnels and, for example, another technique for another set of IKE tunnels. As an example, if a total number of IKE tunnels supported is 12000, a certain range of IKE tunnel IDs (e.g., 1-6000) may be reserved for the timestamp array, which is used by the IKE components based on the techniques disclosed herein and a different range of IKE tunnel IDs (e.g., 6001-12000) may be reserved for IKE tunnels that are monitored using PDPD, as an example. Continuing with this example, when an IKE tunnel is created and the IKE component determines that the DPD techniques disclosed herein are used for DPD, then an IKE tunnel ID from the 1-6000 range is selected. Upon the tunnel being deleted, the IKE tunnel ID is then returned back to the pool.

As shown, array 402 has index numbers starting from IKE tunnel ID 1 through IKE tunnel ID N, where each index number corresponds to an array element with the following information or data points: DPD timestamp, DPD idle timeout threshold, SA reference count (e.g., which may be an atomic variable), suppress time, and the last notification timestamp. In one example, array 402 is accessed and managed by a gateway's IPSec component, such as IPSec component 252 of gateway 125. The DPD timestamp indicates the time at which the last packet was received through an IKE tunnel associated with the corresponding IKE tunnel ID. DPD idle timeout threshold indicates the amount of time that has to pass, from the time indicated by the DPD timestamp, for the IKE tunnel to be declared idle. For example, the DPD idle timeout threshold may be set to 5 seconds and the DPD timestamp may indicate t1. If 5 seconds have passed since t1, then the IKE tunnel may be considered to be idle, in which case IPSec component 252 triggers IKE component 251 to transmit a notification to the peer IKE component. SA reference count indicates the number of inbound SAs associated with the IKE tunnel ID. As described above, in the policy-based mode, multiple IPSec tunnels, each corresponding to a pair of inbound and outbound SAs, may be established on a single IKE tunnel. As such, a SA reference count indicates the number of inbound SAs associated with a corresponding IKE tunnel ID, at a given time. As inbound SAs are created and deleted, the SA reference count is incremented and decremented, using a configuration thread as described below. An SA reference count of zero indicates that the IKE tunnel ID corresponds to an IKE tunnel with no active inbound SA.

Suppress time indicates the amount of time that IPSec component 252 has to wait before triggering IKE component 251 to transmit a notification to the peer IKE component again. For example, if the suppress time is 3 seconds and the last DPD trigger was sent by IPSec component 252 to IKE component 251 at t1, as indicated by the last trigger timestamp, then IPSec component 252 skips triggering IKE component 251 to transmit another notification to the peer IKE component for that IKE tunnel ID until another 3 seconds following t1. Last trigger timestamp indicates the time at which the last trigger was performed. Using the suppress time parameter, as described above, ensures that back to back triggers are not unnecessarily transmitted to IKE component 251. Suppress time may not be the same of all IKE tunnels. In one example, suppress time is calculated as follows:

$$\text{Suppress time} = (\text{\# of notification retry attempts}) * (\text{duration between notifications})$$

In this formula, the number of notification retry attempts refers to the number of times an IKE component is configured to transmit follow up notifications (i.e., retry attempts) to an IKE peer. The duration between notifications refers to the amount of time the IKE component is configured to wait before transmitting another follow up notification.

To manage array 402, IPSec component 252 uses a number of threads. For example, IPSec component 252 may be configured with one or more packet processing threads for recording the time associated with when a packet related to a certain IKE tunnel ID is received, among other things. IPSec component 252 may also be configured with a configuration thread (also referred to as SA configuration thread) that writes DPD related configuration parameters (e.g., DPD idle timeout threshold, suppress time, etc.) and increments or decrements the SA reference counts whenever inbound SAs are created or deleted, respectively. IPSec component 252 may also be configured with a DPD timer thread that is responsible for periodically scanning each valid array element of array 402 and determining whether the corresponding IKE tunnel is idle based on the corresponding DPD timestamp and the DPD idle timeout threshold. Note that although these three threads access array 402, no locking is required (i.e., array 402 is a lockless implementation).

A valid array element of array 402 is an element with a SA reference count of one or more. In other words, an IKE tunnel ID corresponding to an IKE tunnel that has no active inbound SA is associated with an array element that shows an SA reference count of zero and is, therefore, an invalid element. The DPD timer thread is, therefore, configured to first examine whether an IKE tunnel ID corresponds to a valid array element before examining the array element to calculate whether the corresponding IKE tunnel has been idle for more than the DPD idle timeout threshold. This provides a more resource efficient technique for periodically examining the liveliness of a large number of IKE tunnels in array 402, because the DPD timer thread is able to skip performing idleness calculations for IKE tunnels with no active IPSec SAs. Once it is determined that the IKE tunnel has been idle for more than the DPD idle timeout threshold, then the DPD timer thread triggers IKE component 251 to transmit a notification to the peer IKE component. The DPD timer thread examines valid elements of array 402 periodically, such as at least every few hundred milliseconds (e.g., 500 milliseconds). Any other periodicity or time interval may also be used by the DPD timer thread.

In some embodiments, the DPD timer thread uses a bitmap to help optimize the write operations associated with timestamp array 402. Bitmap 400 comprises as many bits as timestamp array 402 comprises indices, such that each bit of bitmap 400 corresponds to a different IKE tunnel ID in timestamp array 402. When the DPD timer thread examines a valid array element and performs an idleness calculation, the DPD timer thread sets the array element's corresponding bit to zero (0). Therefore, from the perspective of the packet processing thread, each bit indicates whether the bit's corresponding array element has been examined by the DPD timer thread, at least in the last 500 milliseconds, or any other time interval the DPD timer thread is configured with. If the bit is set to zero (or vice versa), it means that the array element has been examined by the DPD timer thread in the last 500 milliseconds and that no timestamps have been recorded for the array element since the last time the DPD timer thread examined the array element. In that case, the packet processing thread is configured to record a DPD timestamp in the bit's corresponding array element. However, if the bit is set to one (1), it means that the array element has not yet been examined by the DPD timer thread in the last 500 milliseconds. In that case, the packet processing thread is configured to refrain from recording a DPD timestamp in the corresponding array element, because doing so would not impact the idleness calculation of the DPD timer thread. By utilizing bitmap 400, the packet processing thread(s) are able to reduce the number of writes to array 402.

On the other hand, when the packet processing thread records a DPD timestamp in an array element, it sets the corresponding bit to one. As such, from the perspective of the DPD timer thread, if a bit is set to zero, it means that no new packets have arrived since the DPD timer thread last performed its idleness calculation for the array element. As a result, if during the DPD timer thread's last examination, the IKE tunnel was determined to be idle, then the DPD timer thread may continue to trigger IKE component 251 to transmit follow-up notifications to the peer IKE component, subject to the suppress time restriction, without performing idleness calculations again. If a bit is set to one, it means that a packet has arrived since the DPD timer thread's last examination of the corresponding array element and, therefore, the DPD timer thread should examine the corresponding array element.

Figure 5:
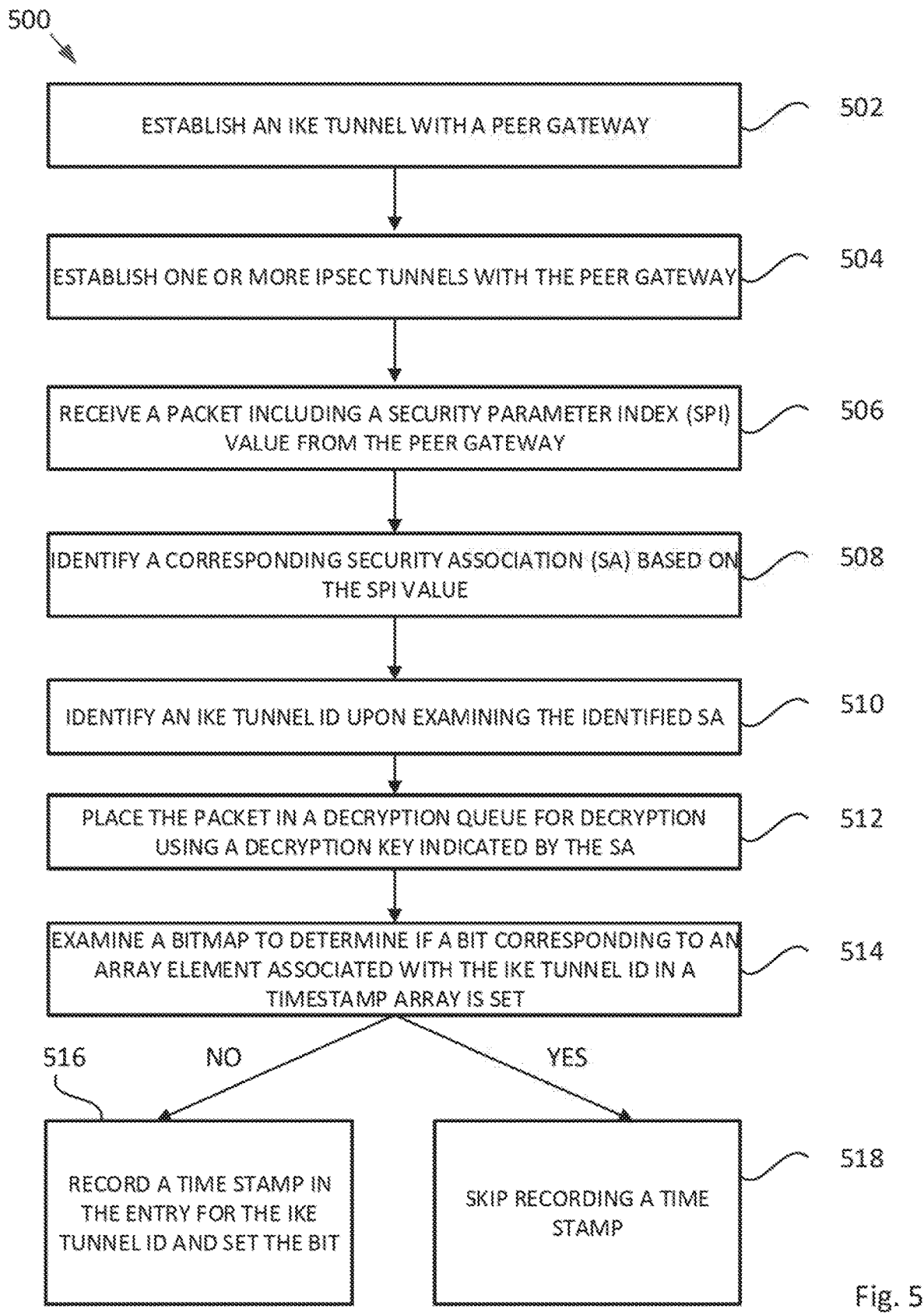
FIG. 5 illustrates example operations of a gateway for updating and managing a timestamp array corresponding to one or more IKE tunnels established between the gateway and a peer gateway, according to certain embodiments.

FIG. 5 illustrates example operations 500 of a gateway for updating and managing a timestamp array corresponding to one or more IKE tunnels established between the gateway and a peer gateway, according to certain embodiments. In one example, operations 500 are performed by gateway 125. However, any other gateway may be configured to perform the same operations.

At step 502, a gateway establishes an IKE tunnel with a peer gateway. For example, IKE component 252 of gateway 125 establishes an IKE tunnel with the peer IKE component of gateway 115, by engaging in Phase 1 of an IKE negotiation process. During this process, IKE component 252 and the peer IKE component set an IKE tunnel ID for the IKE tunnel that is established.

At step 504, the gateway establishes one or more IPSec tunnels with the peer gateway. For example, IKE component 252 establishes an IPSec tunnel with the peer IKE component by engaging in Phase 2 of the IKE negotiation process. Establishing the IPSec tunnel includes establishing inbound and outbound SAs, each including an encryption/decryption key, a unique SPI value, and the IKE tunnel ID, etc. In other words, the IKE components are configured to insert the IKE tunnel ID in the SAs that are established over the IKE tunnel. Once the SAs are established, each of the IKE components is configured to pass the SAs to its corresponding IPSec component. In response, the configuration thread of the corresponding IPSec component updates an array element indexed by the new IKE tunnel ID in the timestamp array, e.g., array 402, with the new IKE tunnel ID, increments the SA reference count, and configures the array element with certain defined parameters, such as the DPD idle timeout threshold and the suppress time.

If gateways 125 and 115 are using the policy-based mode of tunneling, IKE component 252 and the peer IKE component may establish additional IPSec tunnels for the same IKE tunnel. Each IPSec tunnel has its own inbound and outbound SAs, each including a unique SPI value and the same IKE tunnel ID. When additional IPSec tunnels are established, each of the IPSec components is configured to increment the SA reference count of the array element corresponding to the same IKE tunnel ID.

At step 506, the gateway receives an ESP encrypted packet including a SPI value from the peer gateway. For example, gateway 125 receives a packet from gateway 115, the packet having been encrypted using an IPSec tunnel associated with the IKE tunnel established at step 502.

At step 508, the gateway identifies a corresponding SA based on the SPI value. For example, based on the SPI value and the destination IP address, IPSec component 252 of gateway 125 identifies a corresponding SA in the SAD.

At step 510, the gateway identifies an IKE tunnel ID upon examining the identified SA. For example, after identifying the corresponding SA, IPSec component 252 examines the SA to determine the IKE tunnel ID indicated by the SA.

At step 512, the gateway places the packet in a decryption queue for decryption using a decryption key indicated by the SA. For example, IPSec component 252 places the packet in a decryption queue, which allows for the packet to be decrypted while the IPSec component moves to step 514 for potentially updating the timestamp array, such as array 402. This is an optimization that allows for the two tasks of (1) decryption and (2) the potential updating of array 402 to be performed in parallel.

At step 514, the gateway examines a bitmap to determine if a bit corresponding to an array element associated with the IKE tunnel ID in array 402 is set. As described above, a bitmap, such as bitmap 400, is used to optimize the writes to array 402. As such, if the packet processing thread of IPSec component 252 determines that the bit is set (e.g., set to 1), meaning the DPD timer thread has not yet examined the corresponding element during its defined time interval, then at step 518, IPSec component 252 skips recording a timestamp for the IKE tunnel. If the bit is not set, the packet processing thread then records a timestamp in the corresponding array element and sets the bit.

Figure 6:
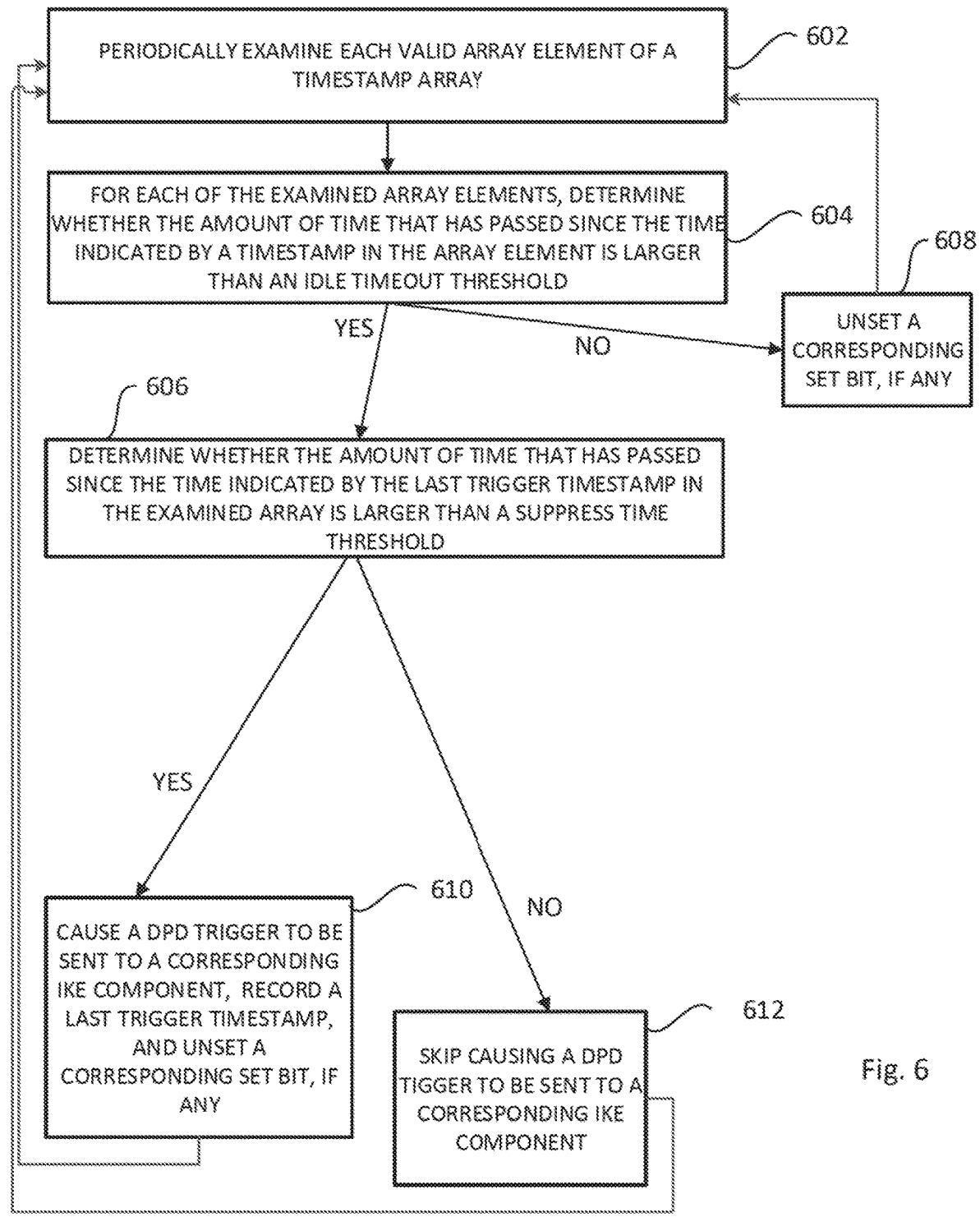
FIG. 6 illustrates example operations of a gateway for performing DPD, according to certain embodiments.

FIG. 6 illustrates example operations 600 of a gateway for performing DPD, according to certain embodiments. In one example, operations 600 are performed by gateway 125. However, any other gateway may be configured to perform the same operations.

At step 602, the gateway periodically examines each valid array element of a timestamp array. For example, the DPD timer thread of IPSec component 252 periodically examines each valid array element of array 402. As discussed, a valid array element is an array element that indicates a SA reference count of more than zero.

At step 604, for each of the examined array elements, the gateway determines whether the amount of time that has passed since the time indicated by a timestamp in the array element is larger than a DPD idle timeout threshold. As discussed, this calculation is referred to as an idleness calculation.

If the answer to the determination of step 604 is no, at step 608, the DPD timer thread refrains from causing IKE component 252 to transmit any notifications to the peer IKE component. Also, if the bit corresponding to the array element is set, the DPD timer thread unsets it.

If the answer to the determination of step 604 is yes, at step 606, the DPD timer thread determines whether the amount of time that has passed since the time indicated by the last trigger timestamp is larger than a suppress time threshold. If yes, then at step 610, the DPD timer thread passes a DPD trigger to IKE component 251 to cause it to transmit a notification to the peer IKE component in order to determine whether the peer IKE component is responsive. In addition, the DPD timer thread records a last trigger timestamp to indicate the time of the last DPD trigger. Also, if the bit corresponding to the array element is set, the DPD timer thread unsets it. Having performed step 610, then the operations loop back to step 602.

If no, at step 612, the DPD timer thread skips causing the transmission of another notification and loops back to step 602.

After receiving a number of DPD triggers and sending a number of notifications to the peer IKE component and receiving no responses, IKE component 251 may be configured to declare that the peer IKE component is "dead" or un-responsive, in which case, IKE component 251 removes the corresponding IKE tunnel and any one or more relating IPSec tunnels. In embodiments where the peer gateways are engaged in route-based tunneling, after removing the corresponding IKE tunnel, the traffic that was previously handled by the non-responsive IKE tunnel can be switched to another active IKE tunnel, if any, established between another pair of IP addresses, or another IKE tunnel can be established.

In host machine 200, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers". OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of performing dead peer detection (DPD) by a local gateway, comprising:
periodically examining one or more array elements of a timestamp array, wherein:
each of the one or more array elements corresponds to a tunnel established between the local gateway and a peer gateway, the tunnel corresponding to one or more security tunnels, the one or more security tunnels corresponding to one or more inbound security associations (SAs) established between the local gateway and the peer gateway; and
each of the one or more array elements comprises a timestamp indicating a time at which a last packet associated with any of the one or more inbound SAs of the corresponding one or more security tunnels of the corresponding tunnel was received by the gateway;
for each of the examined one or more array elements, determining whether a corresponding idle timeout threshold is met;
refraining from causing a notification to be transmitted to the peer gateway when the corresponding idle timeout threshold is not met; and
when the corresponding idle timeout threshold is met:
causing a notification to be transmitted to the peer gateway to determine whether the peer gateway is responsive with respect to a tunnel associated with the examined array element;
monitoring for a response to the notification from the peer gateway; and
determining the peer gateway is responsive if a response to the notification is received from the peer gateway and determining the peer gateway is dead if a response to the notification is not received from the peer gateway.

2. The method of claim 1, wherein:
each of the one or more array elements of the timestamp array is a valid array element comprising a SA reference count that is larger than zero;
periodically examining the one or more array elements comprises skipping any invalid array elements of the timestamp array; and
an invalid array element comprises a SA reference count that is zero.

3. The method of claim 1, further comprising:
establishing a first tunnel that is an internet key exchange (IKE) tunnel with the peer gateway by engaging with the peer gateway in an IKE tunnel creation according to a security protocol, wherein establishing the first tunnel comprises setting an IKE tunnel ID for the first tunnel;
establishing, on the first tunnel, one or more first security tunnels, the one or more first security tunnels being associated with one or more first pairs of inbound-outbound SAs with the peer gateway, the one or more first pairs of inbound-outbound SAs including one or more first inbound SAs, wherein each of the one or more first inbound SAs indicates the IKE tunnel ID;
receiving an encrypted packet from the peer gateway, the encrypted packet including a security parameter index (SPI) value;
identifying an inbound SA from the one or more first inbound SAs based on the SPI value;
determining that the identified inbound SA indicates the IKE tunnel ID corresponding to the first tunnel;
based on determining that the identified inbound SA indicates the IKE tunnel ID corresponding to the first tunnel, examining a bit in a bitmap, the bit corresponding to a first array element in the timestamp array associated with the first tunnel;
determining whether to record a timestamp in the first array element based on whether the bit is set;
upon determining the bit is not set, recording the timestamp in the first array element, the timestamp indicating a time at which the encrypted packet was received; and
upon determining the bit is set, refraining from recording the timestamp in the first array element.

4. The method of claim 3, wherein:
the bit not being set indicates that a DPD timer thread has examined the first array element in a previous examination iteration; and
recording the timestamp in the first array element comprises setting the bit.

5. The method of claim 3, wherein:
the bit being set indicates that a DPD timer thread has not examined the first array element in a previous examination iteration.

6. The method of claim 3, further comprising:
prior to examining the bit, placing the encrypted packet in a decryption queue for decryption using a decryption key indicated by the identified inbound SA.

7. The method of claim 1, wherein causing the notification to be the transmitted to the peer gateway comprises:
determining that an amount of time that has passed since a time indicated by a last trigger timestamp indicated by the array element is larger than a suppress time threshold indicated by the array element; and
triggering an Internet Key Exchange (IKE) component at the local gateway to transmit the notification to the peer gateway.

8. The method of claim 1, wherein an Internet Key Exchange (IKE) component of the local gateway reserves a first range of tunnel IDs for first tunnels associated with the timestamp array and a second range of tunnel IDs for second tunnels not associated with the timestamp array.

9. The method of claim 1, further comprising:
receiving a packet from the peer gateway;
examining a bit in a bitmap, the bit corresponding to a first array element in the timestamp array;
determining whether to record a timestamp in the first array element based on whether the bit is set;

upon determining the bit is not set, recording the timestamp in the first array element, the timestamp indicating a time at which the packet was received; and
upon determining the bit is set, refraining from recording the timestamp in the first array element.

10. A computer system, comprising:
a memory comprising executable instructions; and
a processor in data communication with the memory and configured to execute the instructions to cause the computer system to perform a method, comprising:
periodically examining one or more array elements of a timestamp array, wherein:
each of the one or more array elements corresponds to a tunnel established between a local gateway and a peer gateway, the tunnel corresponding to one or more security tunnels, the one or more security tunnels corresponding to one or more inbound security associations (SAs) established between the local gateway and the peer gateway; and
each of the one or more array elements comprises a timestamp indicating a time at which a last packet associated with any of the one or more inbound SAs of the corresponding one or more security tunnels of the corresponding tunnel was received by the gateway;
for each of the examined one or more array elements, determining whether a corresponding idle timeout threshold is met;
refraining from causing a notification to be transmitted to the peer gateway when the corresponding idle timeout threshold is not met; and
when the corresponding idle timeout threshold is met:
causing a notification to be transmitted to the peer gateway to determine whether the peer gateway is responsive with respect to a tunnel associated with the examined array element;
monitoring for a response to the notification from the peer gateway; and
determining the peer gateway is responsive if a response to the notification is received from the peer gateway and determining the peer gateway is dead if a response to the notification is not received from the peer gateway.

11. The computer system of claim 10, wherein:
each of the one or more array elements of the timestamp array is a valid array element comprising a SA reference count that is larger than zero;
periodically examining the one or more array elements comprises skipping any invalid array elements of the timestamp array; and
an invalid array element comprises a SA reference count that is zero.

12. The computer system of claim 10, wherein the method further comprises:
establishing a first tunnel that is an internet key exchange (IKE) tunnel with the peer gateway by engaging with the peer gateway in an IKE tunnel creation according to a security protocol, wherein establishing the first tunnel comprises setting an IKE tunnel ID for the first tunnel;
establishing, on the first tunnel, one or more first security tunnels, the one or more first security tunnels being associated with one or more first pairs of inbound-outbound SAs with the peer gateway, the one or more first pairs of inbound-outbound SAs including one or more first inbound SAs, wherein each of the one or more first inbound SAs indicates the IKE tunnel ID;
receiving an encrypted packet from the peer gateway, the encrypted packet including a security parameter index (SPI) value;
identifying an inbound SA from the one or more first inbound SAs based on the SPI value;
determining that the identified inbound SA indicates the IKE tunnel ID corresponding to the first tunnel;
based on determining that the identified inbound SA indicates the IKE tunnel ID corresponding to the first tunnel, examining a bit in a bitmap, the bit corresponding to a first array element in the timestamp array associated with the first tunnel;
determining whether to record a timestamp in the first array element based on whether the bit is set;
upon determining the bit is not set, recording the timestamp in the first array element, the timestamp indicating a time at which the encrypted packet was received; and
upon determining the bit is set, refraining from recording the timestamp in the first array element.

13. The computer system of claim 12, wherein:
the bit not being set indicates that a DPD timer thread has examined the first array element in a previous examination iteration; and
recording the timestamp in the first array element comprises setting the bit.

14. The computer system of claim 12, wherein:
wherein the bit being set indicates that a DPD timer thread has not examined the first array element in a previous examination iteration.

15. The computer system of claim 12, wherein the method further comprises:
prior to examining the bit, placing the encrypted packet in a decryption queue for decryption using a decryption key indicated by the identified inbound SA.

16. The computer system of claim 10, wherein causing the notification to be the transmitted to the peer gateway comprises:
determining that an amount of time that has passed since a time indicated by a last trigger timestamp indicated by the array element is larger than a suppress time threshold indicated by the array element; and
triggering an Internet Key Exchange (IKE) component at the local gateway to transmit the notification to the peer gateway.

17. The computer system of claim 10, wherein an Internet Key Exchange (IKE) component of the local gateway reserves a first range of tunnel IDs for first tunnels associated with the timestamp array and a second range of tunnel IDs for second tunnels not associated with the timestamp array.

18. The computer system of claim 10, wherein the method further comprises:
receiving a packet from the peer gateway;
examining a bit in a bitmap, the bit corresponding to a first array element in the timestamp array;
determining whether to record a timestamp in the first array element based on whether the bit is set;
upon determining the bit is not set, recording the timestamp in the first array element, the timestamp indicating a time at which the packet was received; and
upon determining the bit is set, refraining from recording the timestamp in the first array element.

19. A non-transitory computer readable medium having instructions stored thereon that, when executed by a computer system, cause the computer system to perform a method comprising:

periodically examining one or more array elements of a timestamp array, wherein:
  each of the one or more array elements corresponds to a tunnel established between a local gateway and a peer gateway, the tunnel corresponding to one or more security tunnels, the one or more security tunnels corresponding to one or more inbound security associations (SAs) established between the local gateway and the peer gateway; and
  each of the one or more array elements comprises a timestamp indicating a time at which a last packet associated with any of the one or more inbound SAs of the corresponding one or more security tunnels of the corresponding tunnel was received by the gateway;
for each of the examined one or more array elements, determining whether a corresponding idle timeout threshold is met;
refraining from causing a notification to be transmitted to the peer gateway when the corresponding idle timeout threshold is not met; and
when the corresponding idle timeout threshold is met:
  causing a notification to be transmitted to the peer gateway to determine whether the peer gateway is responsive with respect to a tunnel associated with the examined array element;
  monitoring for a response to the notification from the peer gateway; and
  determining the peer gateway is responsive if a response to the notification is received from the peer gateway and determining the peer gateway is dead if a response to the notification is not received from the peer gateway.

20. The non-transitory computer readable medium of claim 19, wherein:
  each of the one or more array elements of the timestamp array is a valid array element comprising a SA reference count that is larger than zero;
  periodically examining the one or more array elements comprises skipping any invalid array elements of the timestamp array; and
  an invalid array element comprises a SA reference count that is zero.

21. The non-transitory computer readable medium of claim 19, wherein the method further comprises:
  establishing a first tunnel that is an internet key exchange (IKE) tunnel with the peer gateway by engaging with the peer gateway in an IKE tunnel creation according to a security protocol, wherein establishing the first tunnel comprises setting an IKE tunnel ID for the first tunnel;
  establishing, on the first tunnel, one or more first security tunnels, the one or more first security tunnels being associated with one or more first pairs of inbound-outbound SAs with the peer gateway, the one or more first pairs of inbound-outbound SAs including one or more first inbound SAs, wherein each of the one or more first inbound SAs indicates the IKE tunnel ID;
  receiving an encrypted packet from the peer gateway, the encrypted packet including a security parameter index (SPI) value;
  identifying an inbound SA from the one or more first inbound SAs based on the SPI value;
  determining that the identified inbound SA indicates the IKE tunnel ID corresponding to the first tunnel;
  based on determining that the identified inbound SA indicates the IKE tunnel ID corresponding to the first tunnel, examining a bit in a bitmap, the bit corresponding to a first array element in the timestamp array associated with the first tunnel;
  determining whether to record a timestamp in the first array element based on whether the bit is set;
  upon determining the bit is not set, recording the timestamp in the first array element, the timestamp indicating a time at which the encrypted packet was received; and
  upon determining the bit is set, refraining from recording the timestamp in the first array element.

22. The non-transitory computer readable medium of claim 21, wherein:
  the bit not being set indicates that a DPD timer thread has examined the first array element in a previous examination iteration; and
  recording the timestamp in the first array element comprises setting the bit.

23. The non-transitory computer readable medium of claim 19, wherein the method further comprises:
  receiving a packet from the peer gateway;
  examining a bit in a bitmap, the bit corresponding to a first array element in the timestamp array;
  determining whether to record a timestamp in the first array element based on whether the bit is set;
  upon determining the bit is not set, recording the timestamp in the first array element, the timestamp indicating a time at which the packet was received; and
  upon determining the bit is set, refraining from recording the timestamp in the first array element.

* * * * *